US007437593B2

(12) United States Patent  
Johnson et al.

(10) Patent No.: US 7,437,593 B2
(45) Date of Patent: Oct. 14, 2008

(54) APPARATUS, SYSTEM, AND METHOD FOR MANAGING ERRORS IN PREFETCHED DATA

(75) Inventors: Mark C. Johnson, San Jose, CA (US); Bitwoded Okbay, Gilroy, CA (US); Andrew Moy, San Jose, CA (US); Lih-Chung Kuo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/619,816

(22) Filed: Jul. 14, 2003

(65) Prior Publication Data

US 2005/0015664 A1 Jan. 20, 2005

(51) Int. Cl.
*G06F 11/00* (2006.01)

(52) U.S. Cl. .............................. 714/2; 714/42; 714/52; 714/776; 370/463

(58) Field of Classification Search ............... 714/2, 714/48, 52, 5, 42
See application file for complete search history.

(56) References Cited

U.S. PATENT DOCUMENTS

| | | | | |
|---|---|---|---|---|
| 4,338,675 | A | | 7/1982 | Palmer et al. ............... 364/748 |
| 4,467,411 | A | | 8/1984 | Fry et al. .................... 364/200 |
| 4,533,995 | A | | 8/1985 | Christian et al. ............ 364/200 |
| 4,888,773 | A | * | 12/1989 | Arlington et al. ........... 714/764 |
| 4,972,316 | A | | 11/1990 | Dixon et al. ................ 364/200 |
| 5,287,483 | A | * | 2/1994 | Utsumi ........................ 714/53 |
| 5,317,718 | A | | 5/1994 | Jouppi ....................... 395/425 |
| 5,461,718 | A | * | 10/1995 | Tatosian et al. ............. 711/206 |
| 5,479,616 | A | * | 12/1995 | Garibay et al. ............. 712/212 |
| 5,581,715 | A | * | 12/1996 | Verinsky et al. .............. 714/48 |
| 5,590,337 | A | * | 12/1996 | Rahman et al. ............. 710/262 |
| 5,649,137 | A | * | 7/1997 | Favor et al. ................. 712/207 |
| 5,845,101 | A | * | 12/1998 | Johnson et al. ............. 712/207 |
| 5,912,906 | A | * | 6/1999 | Wu et al. .................... 714/763 |
| 5,948,095 | A | * | 9/1999 | Arora et al. ................. 712/200 |
| 5,968,197 | A | * | 10/1999 | Doiron ....................... 714/748 |
| 6,049,891 | A | | 4/2000 | Inamoto ........................ 714/6 |
| 6,115,837 | A | * | 9/2000 | Nguyen et al. .............. 714/769 |
| 6,223,309 | B1 | * | 4/2001 | Dixon et al. ................. 714/703 |
| 6,298,403 | B1 | * | 10/2001 | Suri et al. ................... 710/100 |
| 6,314,433 | B1 | * | 11/2001 | Mills et al. .................. 707/202 |
| 6,345,349 | B1 | * | 2/2002 | Coulson ...................... 711/173 |

(Continued)

OTHER PUBLICATIONS http://en.wikipedia.org/wiki/Packet, Sep. 13, 2006.*

(Continued)

*Primary Examiner*—Scott T. Baderman
*Assistant Examiner*—Loan Truong
(74) *Attorney, Agent, or Firm*—Kunzler & McKenzie (57) ABSTRACT

An apparatus, system, and method are provided for managing errors in prefetched data. The apparatus, system, and method identify prefetched data that contains an uncorrectable error. In addition, the apparatus, system, and method initiate an error recovery process only for prefetched data that is actually used by a requesting device, module, or application. The apparatus includes a prefetch module that prefetches data packets, a validation module that determines whether a prefetched data packet contains an uncorrectable error, a transfer module that transfers prefetched data packets to a requester, and an error recovery module that selectively initiates error recovery for those data packets that contain an uncorrectable error and are actually transferred to the requester.

6 Claims, 8 Drawing Sheets

U.S. PATENT DOCUMENTS

| | | | |
|---|---|---|---|
| 6,412,046 B1* | 6/2002 | Sharma et al. | 711/137 |
| 6,449,111 B1* | 9/2002 | Kool et al. | 360/48 |
| 6,487,631 B2* | 11/2002 | Dickinson et al. | 711/112 |
| 6,671,832 B1* | 12/2003 | Apisdorf | 714/52 |
| 6,678,858 B1* | 1/2004 | Imazato | 714/758 |
| 6,804,799 B2* | 10/2004 | Zuraski, Jr. | 714/54 |
| 6,822,913 B2* | 11/2004 | Pochmuller | 365/201 |
| 6,848,070 B1* | 1/2005 | Kumar | 714/758 |
| 6,917,990 B2* | 7/2005 | Henry et al. | 710/6 |
| 6,941,489 B2* | 9/2005 | DeLano | 714/10 |
| 6,963,954 B1* | 11/2005 | Trehus et al. | 711/137 |
| 6,976,201 B2* | 12/2005 | Shin et al. | 714/748 |
| 6,990,550 B2* | 1/2006 | Hesse et al. | 710/313 |
| 7,047,475 B2* | 5/2006 | Sharma et al. | 714/758 |
| 2002/0056027 A1* | 5/2002 | Kanai et al. | 711/137 |
| 2002/0071421 A1* | 6/2002 | Chiu et al. | 370/349 |
| 2002/0199151 A1* | 12/2002 | Zuraski, Jr. | 714/763 |
| 2003/0126371 A1* | 7/2003 | Venkatraman | 711/137 |
| 2003/0147168 A1* | 8/2003 | Galbraith et al. | 360/53 |
| 2003/0226092 A1* | 12/2003 | Kim et al. | 714/776 |
| 2003/0233609 A1* | 12/2003 | Ikonomopoulos et al. | 714/758 |
| 2004/0054953 A1* | 3/2004 | Mitchell et al. | 714/748 |
| 2004/0098660 A1* | 5/2004 | Dong et al. | 714/776 |
| 2004/0103218 A1* | 5/2004 | Blumrich et al. | 709/249 |
| 2004/0103337 A1* | 5/2004 | Smith | 714/2 |
| 2004/0117606 A1* | 6/2004 | Wang et al. | 712/235 |
| 2004/0123044 A1* | 6/2004 | Franaszek | 711/137 |
| 2004/0225948 A1* | 11/2004 | Adkisson et al. | 714/776 |
| 2005/0273644 A1* | 12/2005 | Herley et al. | 714/2 |
| 2006/0184860 A1* | 8/2006 | Takagi | 714/774 |

OTHER PUBLICATIONS http://en.wikipedia.org/wiki/Sector, Sep. 13, 2006.*

* cited by examiner

APPARATUS, SYSTEM, AND METHOD FOR MANAGING ERRORS IN PREFETCHED DATA

BACKGROUND OF THE INVENTION

1. Field of the Invention

The invention relates to data validation. Specifically, the invention relates to apparatus, systems, and methods for managing data for optimized data error recovery for errors in prefetched data.

2. Description of the Related Art

Computer data is frequently stored in primary memory to provide high speed access to the data for other computer devices such as secondary storage controllers, Central Processing Units (CPUs), and the like. Such data is often critical to the proper operation of various computer applications. Data that includes any errors may be unacceptable. Mission critical operations such as financial or business transactions may be aborted if a computer system can not recover from such errors, and must provide adequate assurances that the data retrieved from primary memory is exactly the same as the data that was originally stored in the primary memory.

Figure 1:
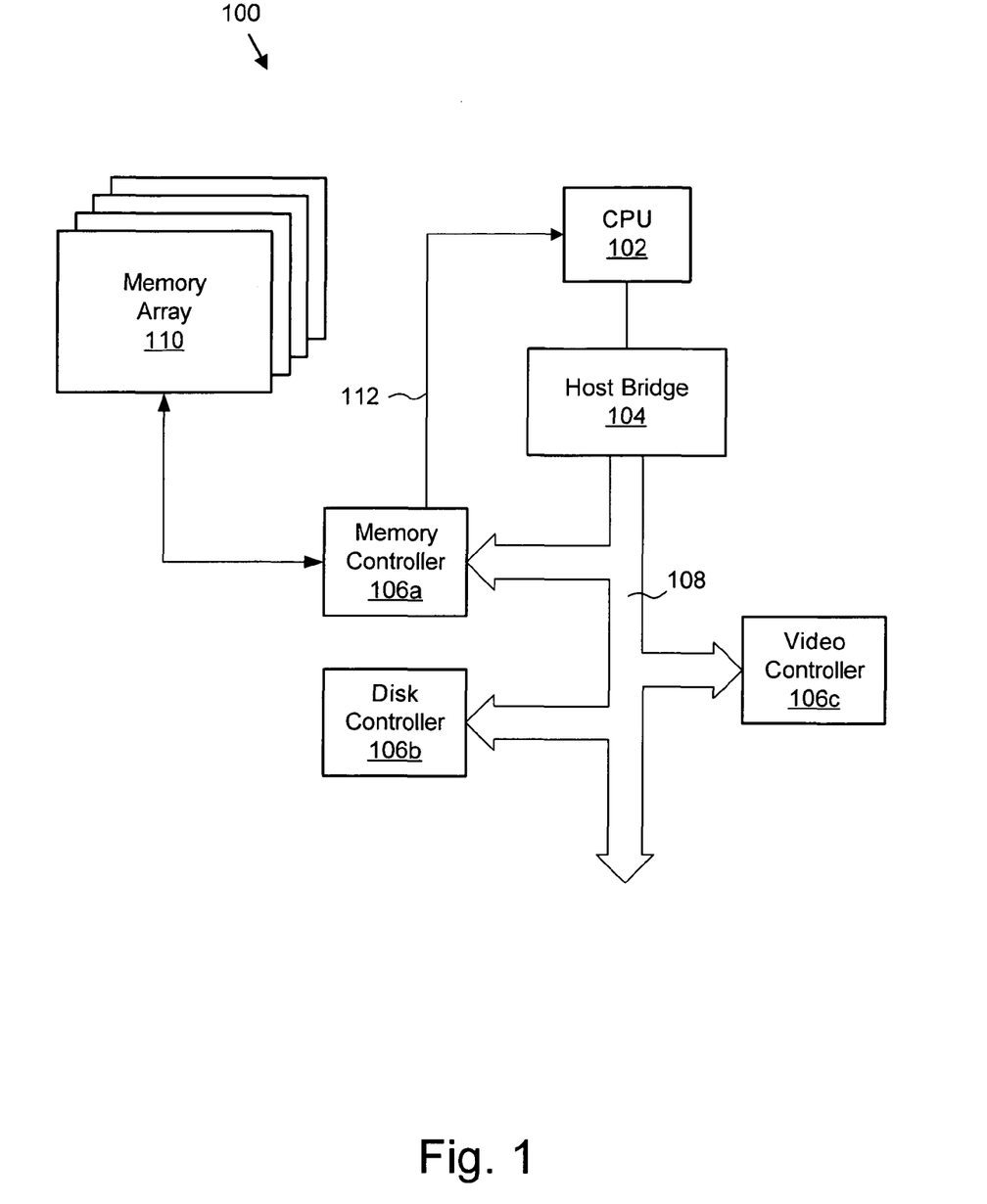
FIG. 1 is a schematic block diagram illustrating one embodiment of a conventional system that prefetches data.

Referring now to FIG. 1, illustrated therein is a representative system 1100 that prefetches data. Specifically, the system 100 prefetches data from primary memory. The system 100 includes a CPU 102 that communicates with a plurality of peripheral devices or modules by way of a host bridge 104 and controllers 106a-c coupled to a communication bus 108. The host bridge 104 allows the CPU 102 to operate with a different clock speed than the communication bus 108, and still operably communicate with peripheral devices.

The controllers 106a-c provide a common interface between the CPU 102 and the peripheral devices. The controllers 106a-c include one or more communication modules configured to communicate over the communication bus 108 using well known protocols such as the Peripheral Component Interconnect (PCI) protocol. Alternatively, the communication bus 108 may implement other communication protocols and associated interfaces including Video Electronics Standards Association (VESA), Industry Standard Architecture (ISA), or the like.

The CPU 102 may communicate with a peripheral device through a controller 106a-c. Alternatively, one peripheral device may communicate with another peripheral device through the CPU 102, or two peripheral devices may communicate directly with each other. For example, in Direct Memory Access (DMA), a peripheral device such as a hard drive coupled to a disk controller 106b may exchange data with a memory array 110 through a memory controller 106a without using the CPU 102.

The memory array 110 generally comprises one or more separate chips in communication with the memory controller 106a. Primary memory technology provides Random Access Memory (RAM) for high speed access to data stored at any specific address within the memory array 110. Data is stored in the memory array 110 in row-column format. A variety of memory technologies may be used to implement the memory array 110 and memory controller 106a. Well known memory types include Static Random Access Memory (SRAM), Dynamic Random Access Memory (DRAM), Fast Page Mode Dynamic Random Access Memory (FPM DRAM), Extended Data-Out Dynamic Random Access Memory (EDO DRAM), Synchronous Dynamic Random Access Memory (SDRAM), Double Data Rate Synchronous Dynamic Random Access Memory (DDR SDRAM), Rambus Dynamic Random Access Memory (RDRAM), and the like.

Typically, an individual memory cell stores a data bit using a capacitor. The capacitors are periodically refreshed to compensate for leaking electrical charge. Unfortunately, this technology may occasionally result in a memory cell changing the value originally written to the memory cell (one to zero or zero to one). Other factors may also cause memory cell errors. Modern memory chips are susceptible to errors, also known as memory faults. Conventionally, memory errors are infrequent; however, for mission critical data, even an infrequent error may prove to be very costly.

To compensate for errors introduced into data stored in primary memory, memory controllers 106a include one or more error validation modules and error correction modules. For example, a memory controller 106a typically includes an Error Correction Code (ECC) module. The ECC module detects and corrects single bit errors found in data stored at a specific address in the memory array 110. If two or more bits are in error, the ECC module can detect such a condition; however, the ECC module is unable to correct the error because of the ambiguity the multiple bit error produces.

Consequently, if a conventional ECC module or other data validation and correction module identifies a multi-bit error in the data, an interrupt signal 112 is immediately generated. The interrupt signal 112 notifies a device or module that requested the data (the "requester") that an uncorrectable error has occurred. Alternatively, as depicted in FIG. 1, the interrupt signal 112 may be sent to a CPU 102 or other controller for the system.

As used herein, "requester" means a device or module that makes a request for data from another device or module of the system 100 such as another controller 106b-c or a CPU 102. As used herein, an "uncorrectable error" means an error in a packet of data stored in the memory array 110 wherein more than one bit is different from the value for the bit originally stored in the memory array 110. Further, an uncorrectable error may be error that can not be corrected by the memory controller 106a.

Once the memory controller 106a signals an uncorrectable error, the requester, typically the CPU 102, initiates an error recovery process. The error recovery process may include a variety of techniques that attempt to correct the data in the data packet with the uncorrectable error. Typically, the recovery techniques progressively increase in the amount of delay caused by the disruption. Each recovery technique is attempted in turn until the data is recovered. Examples of some recovery techniques may include a subsequent attempt to retrieve the data from the memory array 110, a comparison of the data packet with the uncorrectable error to other accurate data, or the like. Eventually, a data recovery process may involve retrieving a backup copy of the data having an uncorrectable error from a secondary storage location such as a disk drive, tape drive, or the like.

Data recovery interrupts the flow and timing of an operation or transaction. The overhead (processing time, media mounts, and data transfers) required to perform data recovery may cause significant delays. In certain cases, data recovery may not be possible and may require that a particular request for data be aborted.

Generally, the communication protocol for the communication bus 108 allows a requester such as the peripheral device or CPU 102 to retrieve data from the memory array 110 using an open-ended request. In an open-ended request, the peripheral device or CPU 102 provides a starting address within the memory array 110 and the memory controller 106a continuously sends sequential data packets beginning at the starting address until the data requester signals the memory controller 106a to stop. In this manner, data may be rapidly transferred, because time is saved by not communicating an ending address.

Typically, the memory controller 106a retrieves data from the memory array 110 faster than the data can be transmitted over the communication bus 108 to the requester. Consequently, the memory controller 106a prefetches data from the memory array 110 into an internal First-In-First-Out (FIFO) buffer, discussed in greater detail below. As data is stored in the FIFO buffer, the memory controller 106a validates and corrects any correctable errors in the data. If an uncorrectable error is discovered, the memory controller 106a sends an interrupt signal 112 to the CPU 102.

Typically, all the prefetched data in the FIFO buffer is not transferred to the requester. The memory controller 106a prefetches more data than the requester desires because the ending address in the memory array 110 is undefined. In addition, the memory controller 106a prefetches data faster than the requester can receive the data. When the requester signals the memory controller 106a to stop sending data, the FIFO buffer may be about fifty percent or more filled with prefetched data that will not be used and is discarded. The prefetched data allows for higher data transfer rates between the memory controller 106 and the requester.

Conventional memory controllers 106a validate and correct prefetched data as the data is stored in the FIFO buffer. If data that includes an uncorrectable error is stored in the FIFO buffer, a conventional memory controller 106a immediately initiates a data recovery process. In this manner, conventional memory controllers 106a ensure that accurate data is stored in the FIFO buffer. Unfortunately, the prefetched data in the FIFO buffer is typically not all transmitted to a requester. Consequently, certain prefetched data that is never transferred to the requester may include uncorrectable errors that needlessly initiate error recovery. The additional processing overhead required to conduct error recovery for unused prefetched data slows the system 100.

Accordingly, what is needed is an improved apparatus, system, and method that overcome the problems and disadvantages of conventional systems 100. In particular, the improved apparatus, system, and method should identify prefetched data that contains an uncorrectable error and initiate error recovery for prefetched data that is actually used by a requesting device, module, or application. Furthermore, the apparatus, system, and method should identify the address in a memory array for data that contains an uncorrectable error to facilitate data recovery. Such an apparatus, system, and method is provided herein.

BRIEF SUMMARY OF THE INVENTION

The present invention has been developed in response to the present state of the art, and in particular, in response to the problems and needs in the art that have not yet been fully solved by currently available stored prefetched data interfaces. Accordingly, the present invention has been developed to provide a process, apparatus, and system for managing errors in prefetched data that overcome many or all of the above-discussed shortcomings in the art.

The apparatus for managing errors in prefetched data includes a prefetch module configured to prefetch data from a first location into a second location. One representative example of a first location and a second location is, respectively, a memory array and a temporary memory buffer. The prefetch module preferably prefetches the data such that data packets are ready to be transmitted to a requesting device once the requesting device is prepared to the receive them. Prefetching data reduces delays in data transmission incurred when retrieving the data from the first location.

The apparatus includes a transfer module configured to transfer the prefetched data packet from the second location. The transfer module transfers a plurality of prefetched data packets to a requesting device. The transfer module transfers prefetched data packets regardless of whether the prefetched data packets contain an uncorrectable error. Transferred prefetched data packets are used by the requester as though the prefetched data packets are free from errors.

The apparatus also includes a validation module configured to determine whether a prefetched data packet contains an uncorrectable error. The validation module may utilize one or more error detection and/or error correction techniques. Specifically, the validation module may perform a Longitudinal Redundancy Check (LRC), Cyclic Redundancy Check (CRC), parity check, or a combination of these to determine whether an error exists in a prefetched data packet. If the error is correctable, the validation module corrects the error. If the error is not correctable, the particular prefetched data packet having an uncorrectable error is identified in a manner described below in greater detail.

An error recovery module, is also provided in the apparatus, and is configured to selectively initiate an error recovery process in response to the transfer module transmitting a prefetched data packet that contains an uncorrectable error. If the validation module determines that a prefetched data packet transmitted by the transfer module contains an uncorrectable error, the error recovery module may almost immediately initiate the error recovery process for the prefetched data packet. Once error recovery is complete, a data transfer may be resumed. Alternatively, the error recovery module may initiate an error recovery process when at least one prefetched data packet contains an uncorrectable error and a data transfer request is completed, such that the error recovery occurs after a data transfer completes.

In one embodiment, the apparatus includes an identification module configured to associate an identifier with the prefetched data packet that contains an uncorrectable error. In one embodiment, the identifier is associated with each prefetched data packet, and the value of the identifier identifies a prefetched data packet as one containing an uncorrectable error. Alternatively, the identifier may be associated just with prefetched data packets containing uncorrectable errors so that the absence or presence of the indicator determines whether the prefetched data packet contains an error. The identifier may comprise one or more bits. The identification module may store the identifier with the prefetched data packets in the second location. Alternatively, the identifier may be stored in a variety of data structures. The identifier serves to mark a prefetched data packet containing an uncorrectable error such that error recovery may be initiated when and if the prefetched data packet is actually transferred from the second location.

A system of the present invention is also presented for managing errors in prefetched data. In particular, the system, in one embodiment, includes a memory interface module and a validation module. The memory interface module is configured to prefetch data from a memory array to a temporary buffer. The validation module is configured to determine whether prefetched data contains an uncorrectable error. As mentioned above, the validation module may use a variety of data validation techniques including CRC, LRC, parity, and the like.

A communication module in communication with the temporary buffer in one embodiment of the system is configured to transmit the prefetched data from the temporary buffer across a communication bus to a requesting device. An error recovery module, in communication with the communication module and validation module, selectively initiates an error recovery process for prefetched data packets transmitted by the communication module that contain an uncorrectable error. In this manner, error recovery is initiated when prefetched data is actually used.

A process of the present invention for managing errors in prefetched data is also presented. In one embodiment, the process includes prefetching data from a first location to a second location. Subsequently, a prefetched data packet is determined to contain at least one error. Then, a determination is made that the prefetched data packet containing at least one error has been transmitted for an intended use. Finally, an error recovery process for the prefetched data packet containing at least one error is selectively initiated in response to transmission of the prefetched data packet. If the data packet is not transmitted, the error recovery process is not initiated the first location or the second location may comprise primary storage, secondary storage, on-board cache, or the like.

In another embodiment, the process may include storing an identifier for the prefetched data containing at least one error in the second location. The identifier may be stored separately or together with the prefetched data. In addition, the process may include storing the address of the prefetched data containing at least one error within the first location.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 2 through 7, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
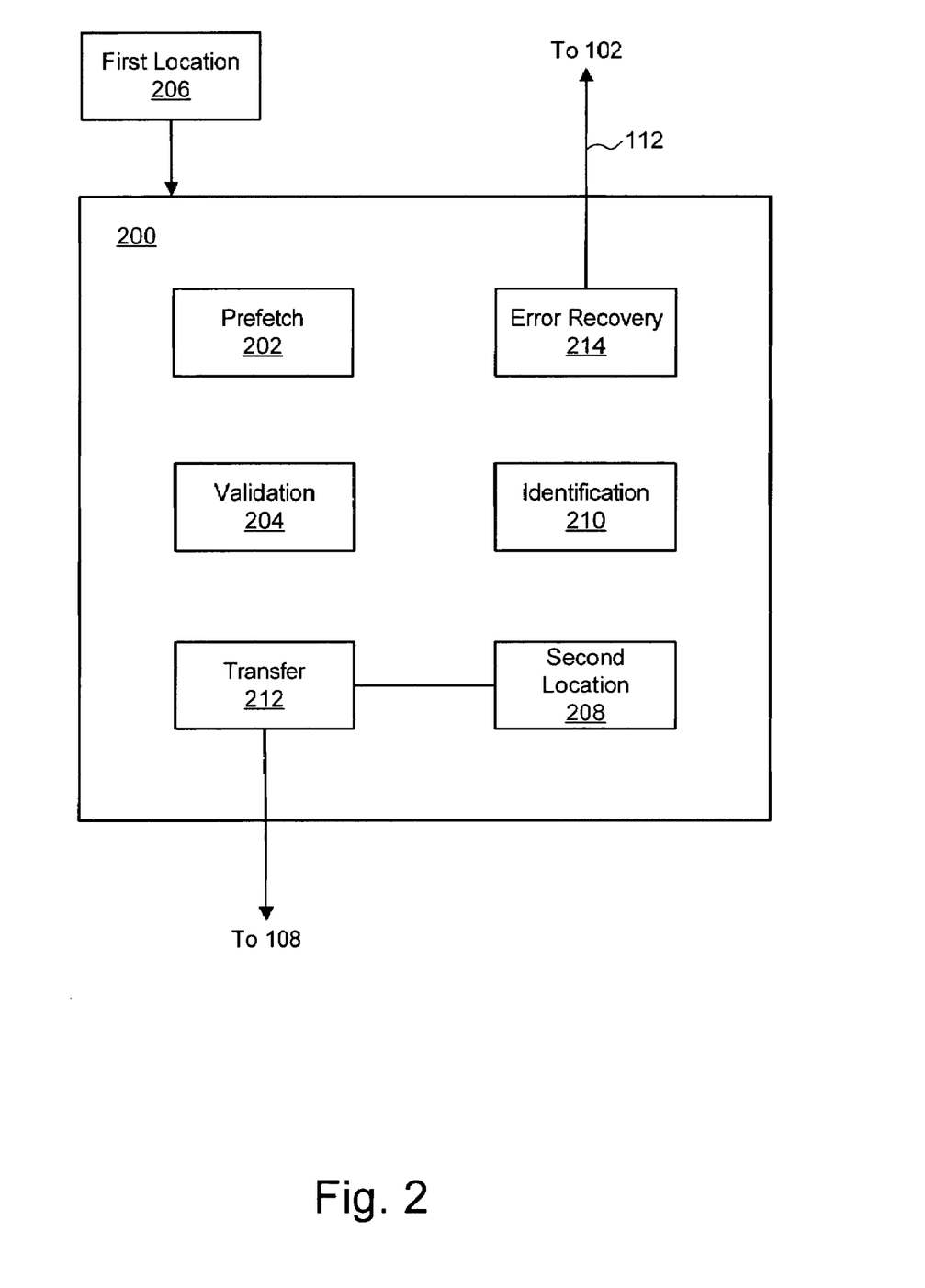
FIG. 2 is a block diagram illustrating one embodiment of an apparatus in accordance with the present invention.

FIG. 2 illustrates an apparatus 200 of the present invention for managing errors in prefetched data. The apparatus 200 includes a prefetch module 202 and a validation module 204. As mentioned above, typically data transfers moving data from a first location 206 to the apparatus 200 are faster than data transfers from the apparatus 200 to a requester such as the memory controller 106b-c or CPU 102 of FIG. 1. The requester may comprise any module or device configured to communicate a data transfer request across the communication bus 108. Different clock speeds and various other factors may cause the difference in transfer rates. In response, the apparatus 200 leverages the speed advantage between the apparatus 200 and the first location 206 by prefetching data.

Specifically, the prefetch module 202 retrieves more data than the quantity of data presently requested by the requester. Prefetching data allows the apparatus 200 to efficiently satisfy data requests. If the requester issues an open-ended request, defined above, the data is prefetched until an end-of-transfer signal is received. The open-ended request is fulfilled efficiently, because there is no additional processing overhead associated with providing the end address for the data transfer. Instead, the requester provides the starting address, and the apparatus 200 transmits sequential data packets to the requester until the apparatus 200 receives an end-of-transfer signal. Once the apparatus 200 fulfills the data transfer request, the apparatus 200 discards any prefetched, untransmitted data.

The prefetch module 202 prefetches data into a second location 208. In one embodiment, the second location 208 is a temporary buffer. The temporary buffer is typically a high-speed memory element that holds comparatively less data than the first location 206. For example, the first location 206 may store about 512 Megabytes and the second location 208 may store about 16 Megabytes. In certain embodiments, the second location 208 is managed such that the first data packet placed in the second location 208 is the first data packet to be retrieved according to a First-In-First-Out (FIFO) scheme.

The first location 206 and second location 208 may comprise any devices or modules suitable for storing data, whether long-term or temporary. In the depicted embodiment, the first location 206 comprises Random Access Memory (RAM). The RAM may be configured according to a variety of conventional hardware and protocol standards including SRAM, DRAM, FPM DRAM, EDO DRAM, SDRAM, DDR SDRAM, RDRAM, and the like.

The validation module 204 of the apparatus 200 performs data integrity checks on prefetched data packets retrieved from the first location 206. In one embodiment, these data integrity checks are performed before the prefetched data packet is stored in the second location 208. The data integrity checks may include one or more conventional procedures and associated metadata to confirm that the data read from the first location 206 is the same as the data originally written to the first location 206. In certain embodiments, the validation module 204 may be referred to as an Error Correction Code (ECC) module.

In one embodiment, the validation module 204 detects and corrects single bit errors in prefetched data packets read from the first location 206. If the validation module 204 detects a multi-bit error in a prefetched data packet, however, the error is determined to be an uncorrectable error. The validation module 204 then determines which prefetched data packets contain an uncorrectable error. While a prefetched data packet containing the uncorrectable error may be infrequent, even a single uncorrectable error may be critical for certain applications.

Certain embodiments of the apparatus 200 may include an identification module 210 in communication with the validation module 204. If the validation module 204 determines that a specific prefetched data packet contains an uncorrectable error, the identification module 210 stores an identifier associated with the prefetched data packet. The identifier may be stored in various locations. The identifier indicates that the prefetched data packet contains an uncorrectable error, which allows a determination to be made later regarding initiation of error recovery.

The apparatus also includes a transfer module 212 and an error recovery module 214. The transfer module 212 transfers the prefetched data from the second location 208 to the requester by way of the communication bus 108. The transfer module 212 may include a variety of communication interfaces depending on the communication protocol of the communication bus 108. In one embodiment, the transfer module 212 communicates with the error recovery module 214. When the transfer module 212 transfers a prefetched data packet containing an uncorrectable error to the communication bus 108, the error recovery module 214 initiates an error recovery process.

In certain embodiments, in response to transferring a data packet associated with an identifier, the transfer module 212 sends a signal to the error recovery module 214, which in turn sends an interrupt signal 112 to a CPU 102 or a requester. As mentioned above, the interrupt initiates a process that attempts to recover data contained within the data packet that contains an uncorrectable error.

In the depicted embodiment, the error recovery module 214 does not execute the error recovery process. The error recovery process may comprise various methods including re-retrieving the data packet from the first location 206, restoring the data packet from secondary storage, aborting the operation, or the like. In an alternative embodiment, the transfer module 212 may send a signal to the validation module 204. In response to the signal, the validation module 204, rather than the error recovery module 214, may signal an interrupt signal 112 to initiate an error recovery process. Of course, various components of the apparatus 200 may initiate the error recovery process according to various flags, signals, semaphores or the like so long as the error recovery process in not initiated until the data packet containing the uncorrectable error is transmitted from the second location 208.

Figure 3:
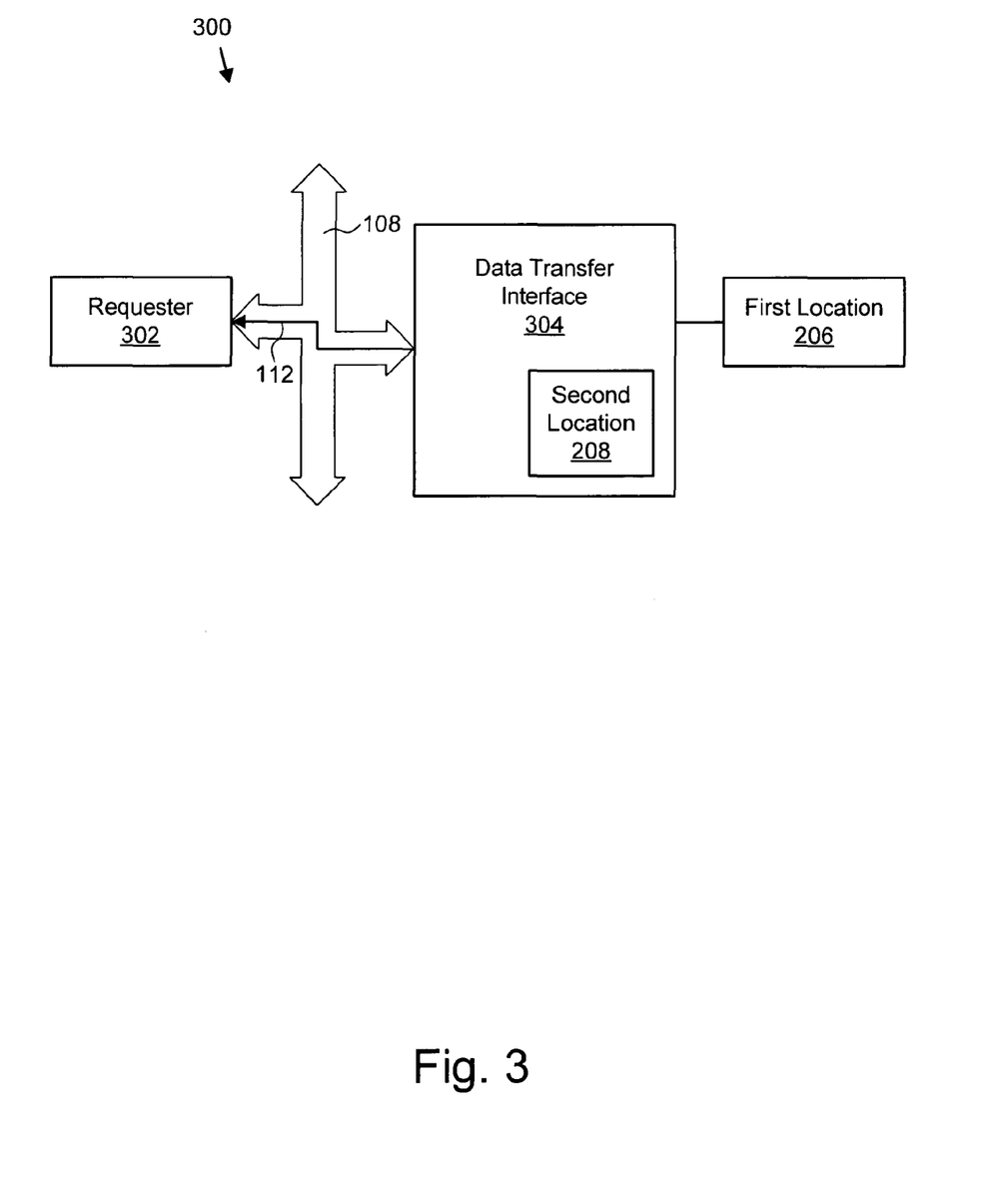
FIG. 3 is a block diagram illustrating another embodiment of an apparatus in accordance with the present invention.

FIG. 3 illustrates an alternative apparatus 300 for managing errors in prefetched data. The apparatus 300 includes a requester 302 and a data transfer interface 304. The requester 302 may comprise any module or device configured to communicate a data transfer request across the communication bus 108. For example, the requester 302 may comprise a CPU 102 that requests data from main memory. Alternatively, the requester 302 may comprise a hard drive (not shown) that requests data using the Direct Memory Access (DMA) protocol for storage of data in main memory onto the hard drive.

The first location 206 may comprise any form of memory or data storage including main memory, hard drive storage media, removable storage media, or the like. In the depicted embodiment, the data transfer interface 304 prefetches data requested by the requester 302 from the first location 206. Data retrieved from the first location 206 is temporarily stored in the second location 208. The data transfer interface 304 determines whether a prefetched data packet contains an uncorrectable error. If that specific prefetched data packet is transferred to the requester 302, the data transfer interface 304 initiates an error recovery process for the prefetched data packet containing an uncorrectable error.

Typically, the requester 302 uses the prefetched data transferred by the data transfer interface 304 with the expectation that the data is valid, error free. However, because in this instance, this is not the case, the data transfer interface 304 generates an interrupt signal 112 to notify the requester 302 that the data packet contains an uncorrectable error. In the depicted embodiment, the data transfer interface 304 may send the interrupt signal 112 directly to the requester 302. Alternatively, the data transfer interface 304 may send the interrupt signal 112 to a CPU 102, which then communicates the error condition to the requester 302. In yet another alternative embodiment, the data transfer interface 304 may communicate the error condition to the requester 302 using a messaging protocol that is not as disruptive as an interrupt signal 112.

Figure 4:
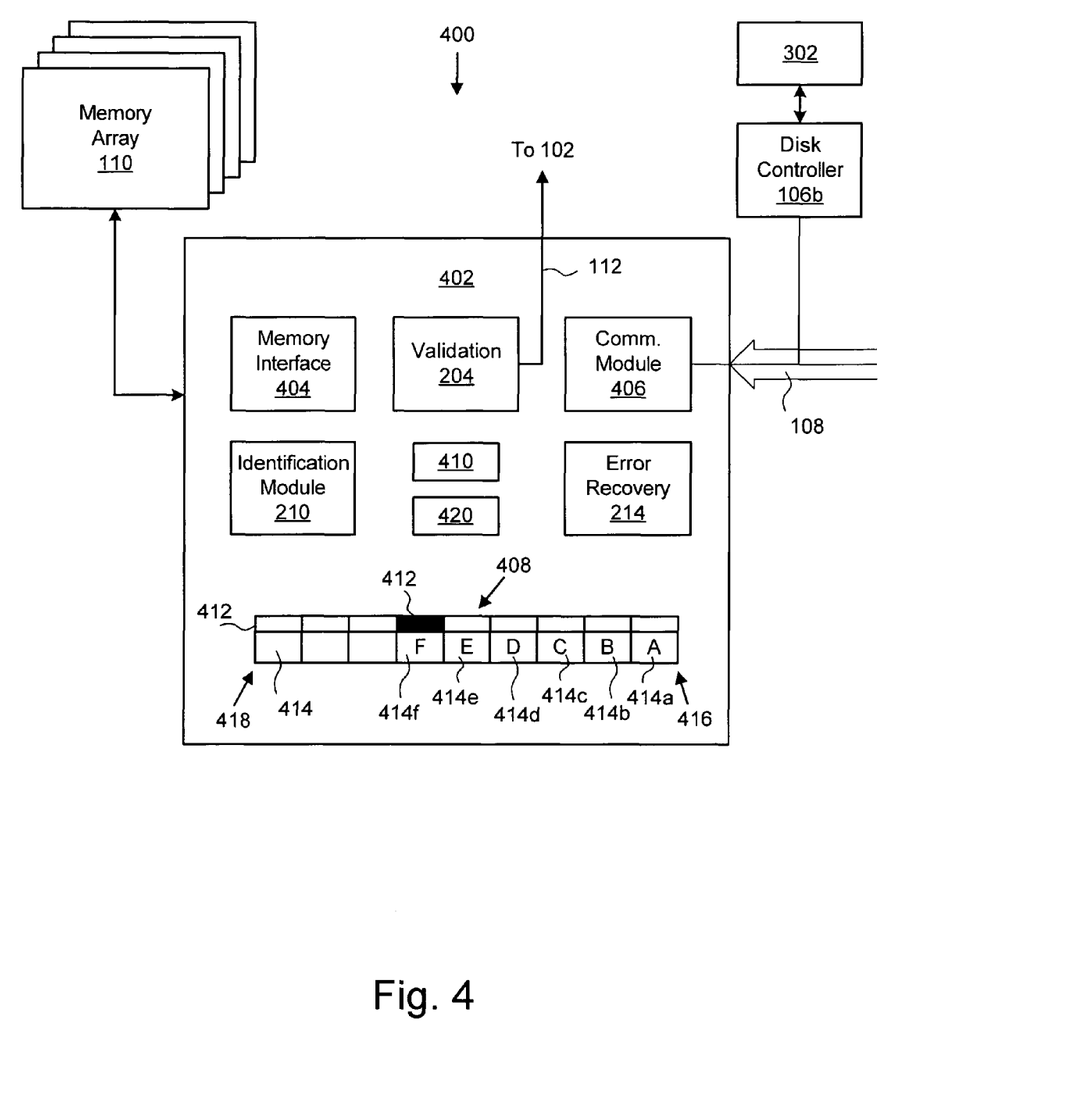
FIG. 4 is a block diagram illustrating one embodiment of a system in accordance with the present invention.

FIG. 4 illustrates a system 400 for managing errors in prefetched data. The system 400 includes a memory array 110 and a disk controller 106b similar to that described above in relation to FIG. 1. In the depicted embodiment, components similar to those described in relation to FIG. 2 are housed within a memory controller 402 that is configured to implement the present invention.

Specifically, the memory controller 402 includes a validation module 204, an identification module 210, and an error recovery module 214. Of course, these components may be organized in various configurations in other embodiments of the present invention. In the depicted embodiment, these components perform substantially all the same functions as described above in relation to FIG. 2 as well as additional functions described below.

The memory controller 402 also includes a memory interface 404 and a communication module 406. The memory interface 404 transfers data to and from the memory array 110. As mentioned above, typically, the memory interface 404 retrieves data from the memory array 110 faster than the requester 302 can receive data transferred by the communication module 406. Consequently, the memory interface 404 prefetches and stores data in a temporary buffer 408 until the requester 302 is ready to receive the next data packet in a data request.

The communication module 406 transfers data from the temporary buffer 408 across the communication bus 108 to the requester 302. For example, the communication module 406 may include a communication interface such as a PCI interface. Alternatively, or in addition, the communication module 406 may include interfaces for other communication protocols.

As mentioned above, prefetching data allows the memory controller 402 to operate more efficiently than retrieving each data packet in response to a specific data packet request. It is desirable that data packets retrieved from the memory array 110 are checked to ensure data integrity. In the depicted embodiment, the validation module 204 and identification module 210 cooperate to confirm data integrity. If the validation module 204 determines that a prefetched data packet contains an uncorrectable error, instead of signaling an interrupt 112 immediately, as conventional memory controllers 106a do, the validation module 204, in one embodiment, records that the prefetched data packet contains an uncorrectable error.

In one embodiment, the validation module 204 may also store the address 410 for the prefetched data packet with an uncorrectable error to facilitate error recovery. The address 410 indicates where in the memory array 110 the prefetched data is stored. In the depicted embodiment, the address 410 is stored in a memory register (not shown) of the memory controller 402.

Next, the validation module 204 may communicate to the identification module 210 the determination that a prefetched data packet contains an uncorrectable error. As mentioned above, the identification module 210 associates an identifier 412 with the data packet 414. In the depicted embodiment, the identification module 210 stores the identifier 412 in the temporary buffer 408 with the prefetched data packet 414 that contains an uncorrectable error.

The identifier 412 may comprise any suitable indicator. In the embodiment of FIG. 4, the identifier 412 is a single bit that is added to each data packet 414 stored in the temporary buffer 408. If the bit is set (illustrated by the blackened box), this indicates that the prefetched data packet 414 contains an uncorrectable error. Alternatively, the identifier 412 may comprise a plurality of bits. In another embodiment, the identifier 412 may be stored separate from the associated data packet 414.

In the depicted embodiment, the memory interface 404, validation module 204, and identification module 210 cooperate to determine whether or not a prefetched data packet has an uncorrectable error before the memory interface 404 writes the prefetched data packet 414 to the temporary buffer 408. Consequently, in the depicted embodiment, prefetched data packets 414 containing an uncorrectable error are marked within the temporary buffer 408. In this manner, if prefetched data packets 414 are sent to a requester 302, those prefetched data packets 414 containing an uncorrectable error are readily identifiable.

It is desirable in the preferred embodiment that the temporary buffer 408 function according to the First-In-First-Out (FIFO) scheme described above. The temporary buffer 408 may implement this scheme using a variety of data structures and methods. The following implementation is intended only as an example.

In the depicted embodiment, the temporary buffer 408 comprises a list having a front 416 and a back 418. A prefetched data packet 414 and identifier 412 is written to the temporary buffer 408 by appending the data packet 414 and identifier 412 to the back 418. Each prefetched data packet 414 and identifier 412 is read in turn from the front 416. In this manner, the temporary buffer 408 implements the FIFO scheme.

The communication module 406 reads each prefetched data packet 414 and identifier 412 at the rate required to maintain communication with the requester 302. The communication module 406 communicates each prefetched data packet 414 and identifier 412 with the error recovery module 214. The error recovery module 214 reads the identifier 412 for each data packet 418 sent by the communication module 406. If the identifier 412 is set (indicated in FIG. 4 by a black box), the error recovery module 214 initiates an error recovery process.

In certain embodiments, the error recovery module 214 initiates an error recovery process by setting a flag 420. The flag 420 may comprise a hardware or software latch. Alternatively, the error recovery module 214 may initiate an error recovery process by sending a signal to the validation module 204. Those of skill in the art will readily recognize that a variety of methods may be implemented in hardware and/or software to enable the error recovery module 214 to initiate an error recovery process. All such methods are considered within the scope of the present invention.

In one configuration, the error recovery module 214 issues an interrupt signal 112 to a CPU 102, or other controller. In the depicted embodiment, the validation module 204 monitors the flag 420 such that in response to the flag 420 having been set, the validation module 204 sends the interrupt signal 112. As mentioned above, the interrupt signal 112 initiates an error recovery process that is typically disruptive of a data transfer currently in progress.

The memory controller 402 of FIG. 4 provides that uncorrectable errors in data packets initiate an error recovery process when the prefetched data packet is transferred for use by the requester 302, instead of when the prefetched data packet is written to the temporary buffer 408. Suppose for example, that a requester 302 (a hard drive) initiates a DMA transfer specifying the beginning address of data in the memory array 110 with instructions that the memory controller 402 continue sending data until the requester 302 signals the memory controller 402 to stop. Consequently, the memory controller 402 prefetches data packets 414 and keeps the temporary buffer 408 substantially full.

Further suppose that prefetched data packet 414f contains an uncorrectable error. In a conventional memory controller 106a, writing prefetched data packet 414f to the temporary buffer 408 causes the memory controller 106a to send an interrupt signal 112. In contrast, the memory controller 402 in the depicted embodiment does not send an interrupt signal 112 unless the prefetched data packet 418f is sent to the requester 302.

In this embodiment, the requester 302 signals the memory controller 402 to stop sending data once the prefetched data packet D 414d is received by the requester 302. As a result, the prefetched data packet F 414f containing an uncorrectable error remains in the temporary buffer 408 and is discarded because the data transfers ends. The validation module 204 does not send an interrupt signal 112, because the error recovery module 214 has not set the flag 420 or otherwise signaled the validation module 204 to do so. Consequently, prefetched data packet F 414f goes unused and does not result in initiation of a disruptive error recovery process.

Figure 5:
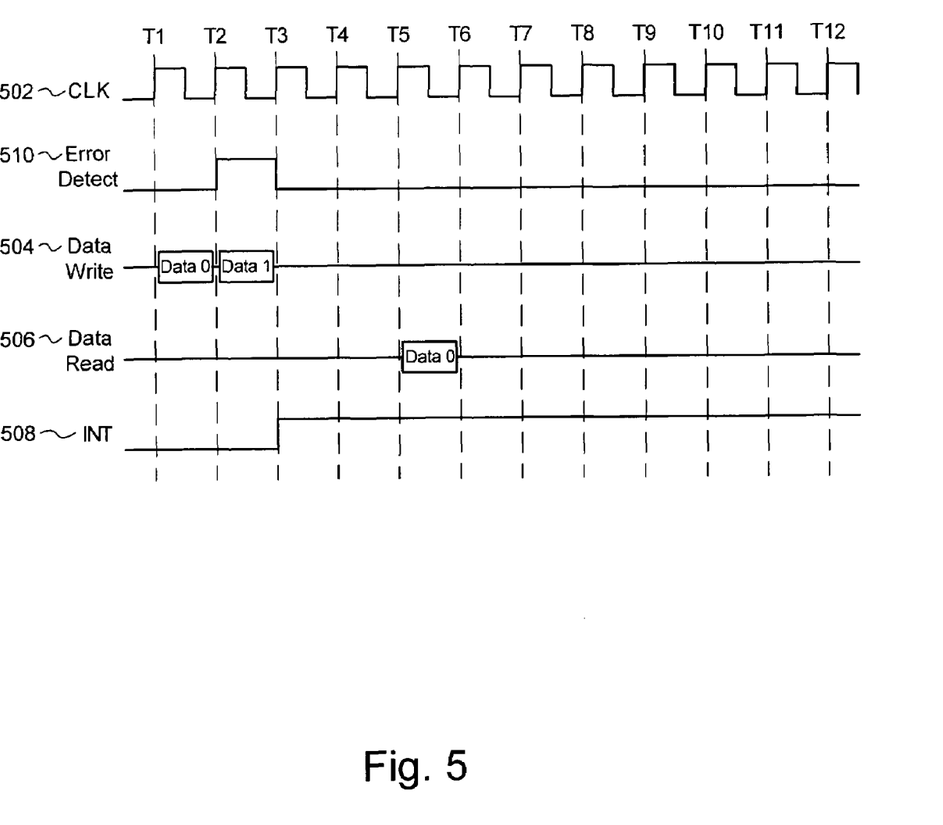
FIG. 5 is a timing diagram illustrating one data transfer scenario illustrating how uncorrectable errors in prefetched data are managed by conventional systems.
Figure 6:
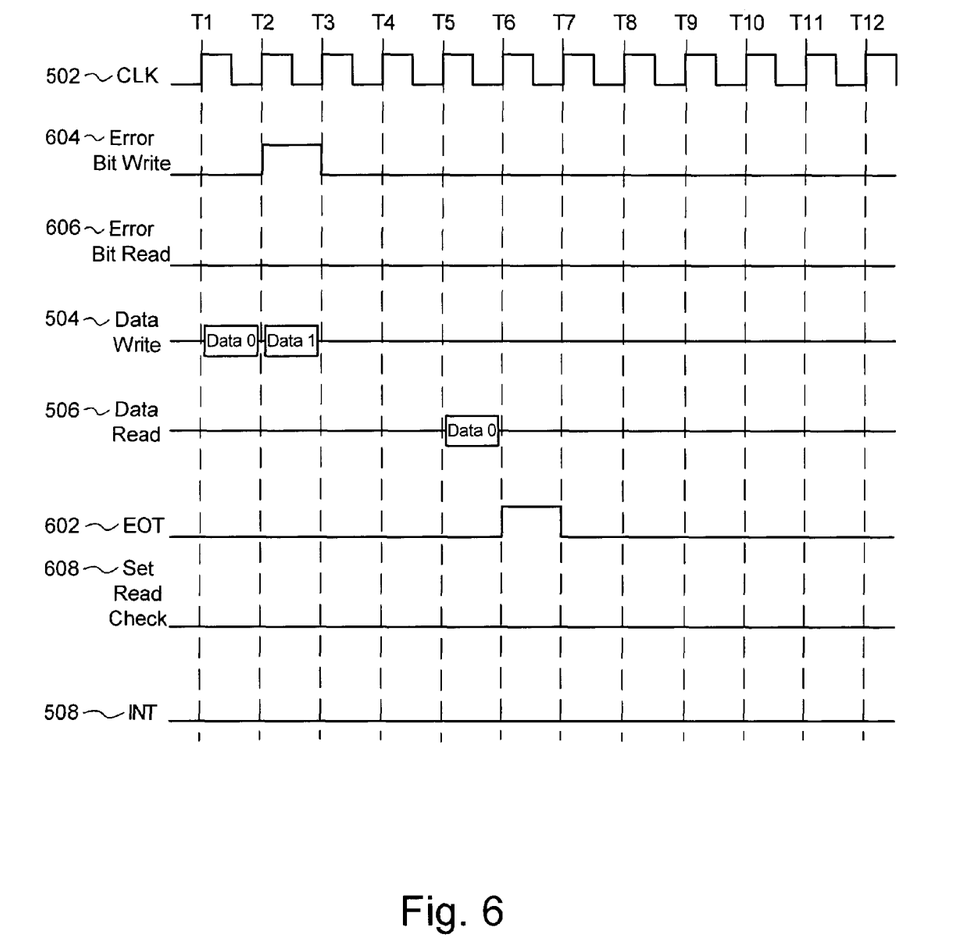
FIG. 6 is a timing diagram illustrating the data transfer scenario of FIG. 5 as managed by one embodiment of the present invention.
Figure 7:
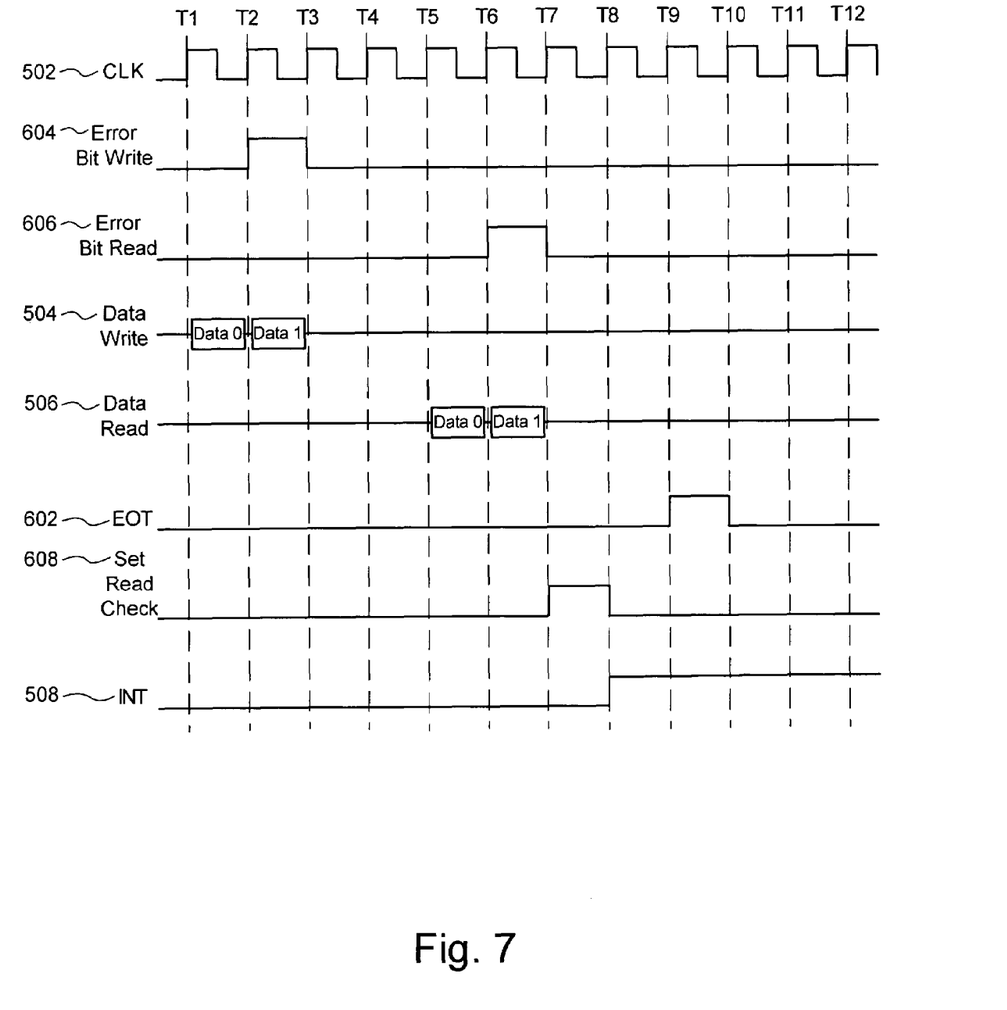
FIG. 7 is a timing diagram illustrating another data transfer scenario involving a prefetched data packet with an uncorrectable error as managed by one embodiment of the present invention.

The present invention may be embodied in hardware, software, or a combination of these. FIGS. 5-7 are timing diagrams illustrating three data transfer scenarios. FIG. 5 illustrates a data transfer scenario conducted using a conventional device. FIG. 6 illustrates the data transfer scenario of FIG. 5 using an embodiment of the present invention. FIG. 7 illustrates a second data transfer scenario conducted using a further embodiment of the present invention.

FIGS. 5-7 include several common signals. A clock signal 502 (CLK) represents clock cycles for the device. Lines T1-T12 represent complete clock intervals. A data write signal 504 (Data Write) represents the time period in which a prefetched data packet 414 is written to a second location 208 such as the temporary buffer 408 in FIG. 4. A data read signal 506 (Data Read) represents the time period in which a prefetched data packet 414 is read from the second location 208. In FIGS. 5-7, Data0 represents a prefetched data packet 414 free of uncorrectable errors. Data1 represents a prefetched data packet 414 containing an uncorrectable error. An interrupt signal 508 (INT) car represents when an interrupt signal 112 is issued to initiate an error recovery process.

FIG. 5 is a timing diagram representing a scenario in which Data1 is prefetched by a conventional system, but not transferred to the requester 302. FIG. 5 includes an Error Detect signal 510 that represents when an error correction code (ECC) module of the conventional system determines that Data1 contains an uncorrectable error. At clock cycle T1, Data0 is written to a temporary buffer 408. At clock cycle T2, Data1 is written to the temporary buffer 408, and Error Detect 510 goes high, meaning the signal changes to its maximum value. As used herein, "going high" and "going low" respectively mean that a signal has changed values from its minimum value, typically a zero, to its highest value, typically a one, and vice versa. Similarly, "going high" and "going low" are also intended to mean when a signal is respectively set or not set.

Consequently, at clock cycle T3, the conventional memory controller 106a signals an interrupt 112, and INT 508 goes high. As a result, the data transfer is interrupted as error recovery is performed for Data1. Unfortunately, as illustrated by the Data Read signal 506, the requester 302 has received all the necessary data once Data0 is transferred. The recovered Data1 is never transmitted to the requester 302. Once the data transfer ends, the memory controller 402 flushes any prefetched data packets 414 still in the temporary buffer 408 (Data1 in FIG. 5).

FIG. 6 illustrates a timing diagram for the same scenario described above in relation to FIG. 5 as conducted using one embodiment of the present invention. In certain embodiments of the present invention, additional signals may be exchanged. An End of Transfer signal 602 (EOT) represents when a requester 302 indicates that the data transfer should stop, particularly an open-ended data transfer. The identifier 412, discussed above, may comprise a single bit, also referred to as an error bit. Consequently, an error bit write signal 604 (Error Bit Write) represents a signal set, for example, when an identifier 412 is written with the prefetched data packet 414 to a temporary buffer 408. Similarly, an error bit read signal 606 (Error Bit Read) represents a signal set, for example, when an identifier 412 containing a suitable value is read from the temporary buffer 408 with the prefetched data packet 414. Alternatively, the error bit write 604 and error bit read 606 signals may go high according to the absence or presence of the identifier 412 associated with a prefetched data packet 414.

In certain embodiments, the present invention includes a set read check signal 608 (Set Read Check). For example, rather than setting a flag 420, the error recovery module 214 may send a set read check signal 608 to the validation module 204. The set read check signal 608 may represent a communication signal in one embodiment between the error recovery module 214 and the validation module 204. Alternatively, the set read check signal 608 may comprise a flag that is continuously checked by the validation module 204. In response to the set read check signal 608, the validation module 204 initiates an error recovery process.

In FIG. 6, because the same scenario is represented as that illustrated in FIG. 5, the CLK signal 502, Data Write signal 504, and Data Read signal 506 are exactly the same. As in FIG. 5, at clock cycle T2 an error is detected. Specifically, the validation module 204 determines that Data1 contains an uncorrectable error. As a result, Error Bit Write 604 goes high. The data packet 414 for Data1 is stored in the temporary buffer 408 with an error bit, identifier 412, that is set.

FIG. 6, illustrates that the INT signal 508 remains low at clock cycle T3. An uncorrectable error has been detected; however, error recovery has not been initiated. In contrast, in FIG. 5, the INT signal goes high at clock cycle T3, and error recovery is performed for Data1. In FIG. 6, the INT signal 508 remains low, as does the Set Read Check signal 608 for the remaining clock cycles. The EOT signal 602 goes high at clock cycle T6, because, as in FIG. 5, the requester 302 has received all the necessary data packets 414, and the data transfer terminates. Consequently, although an uncorrectable error in Data1 was detected by the present invention, no interrupt signal 112 was generated, because the prefetched data containing the uncorrectable error was not used by the requester 302.

FIG. 7 illustrates a scenario of signal exchanges in relation to one embodiment of the present invention in which a prefetched data packet 414 containing an uncorrectable error, Data1, is transmitted to the requester 302. For clarity, signals Error Bit Write 604 and Data Write 504 are exactly the same as the corresponding signals in FIG. 6. Data Read 506 is also the same, except that in this scenario, Data1 is read from the temporary buffer 408 (Data Read 506 includes Data1 at clock cycle T6).

When Data1 is read from the temporary buffer 408 and transmitted to the requester 302 by the communication module 406, the error recovery module 214 recognizes that the identifier 412, the error bit, is set. Consequently, the Error Bit Read 606 goes high. Because the Error Bit Read signal 606 is high and the Data1 data packet 414 has been transmitted, the error recovery module 214 sets the Set Read Check 608 in clock cycle T7. In response to the Set Read Check signal 608 going high, the INT signal 508 goes high, and the validation module 204 sends an interrupt signal 112. As a result, an error recovery process is initiated. Later, in clock cycle T9, an EOT signal 602 is set by the requester 302. Accordingly, the present invention properly initiates an error recovery process when a prefetched data packet 414 containing an uncorrectable error is transmitted to the requester 302.

Figure 8:
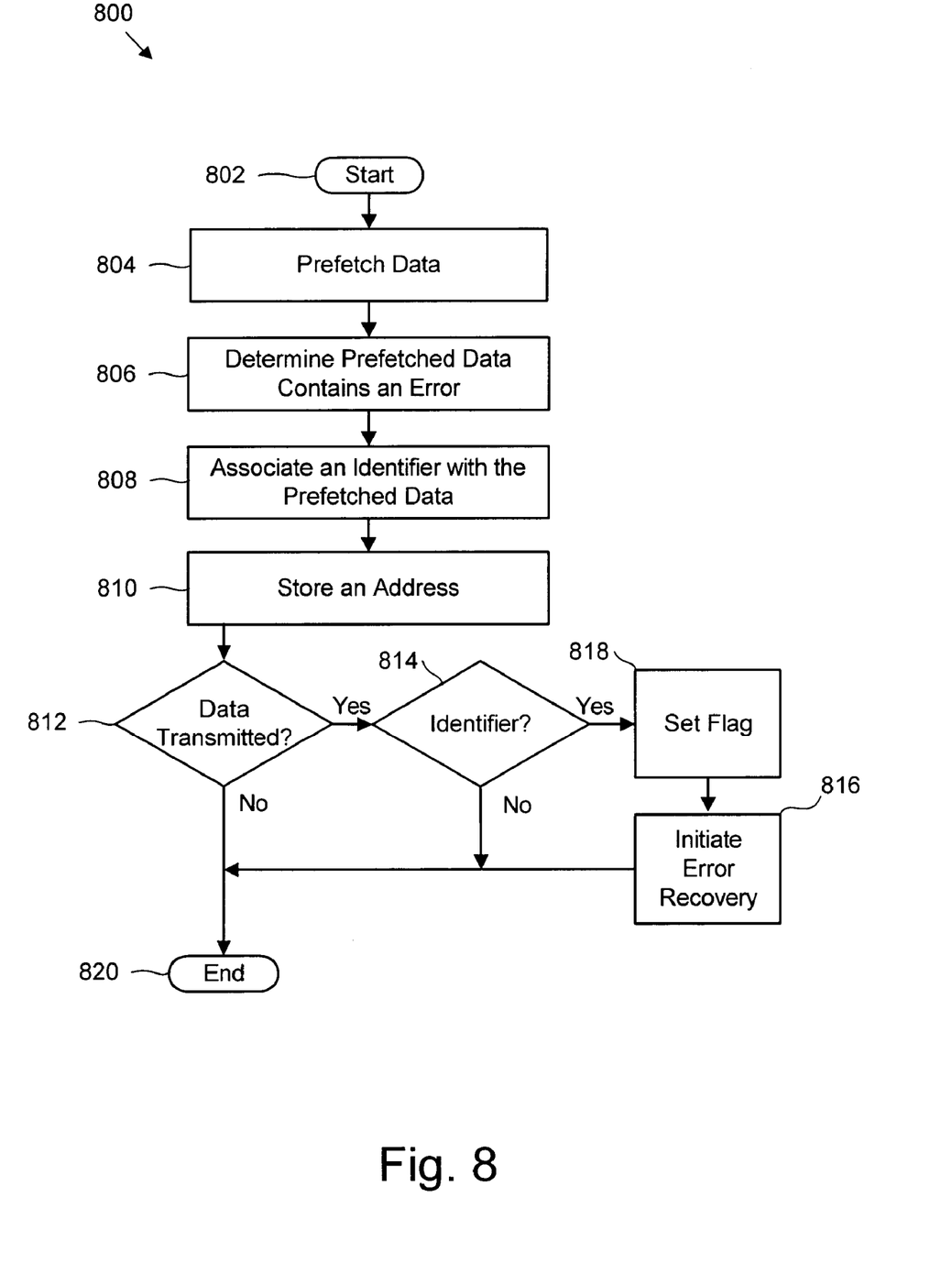
FIG. 8 is a schematic flow chart illustrating a method for managing errors in prefetched data according to one embodiment of the present invention.

FIG. 8 illustrates a method 800 for managing errors in prefetched data. The method 800 starts 802 when a requester 302 makes a request for data from a first location 206. First, data is prefetched 804 from the first location 206 to a second location 208. In one embodiment, data is continually written to, and read from, the second location 208 according to a FIFO scheme as the data transfer request is executed.

In one embodiment, as prefetched data packets 414 are stored in the second location 208, a determination 806 is made that a prefetched data packet 414 contains at least one uncorrectable error. In certain configurations, an identifier 412 may then be associated 808 with the prefetched data packet 414 that contains at least one uncorrectable error. For example, an error bit identifier 412 may be set before being stored in the temporary buffer 408. In another embodiment, an address 410 within the first location 206 for the prefetched data packet 414 containing an uncorrectable error may be stored 810 for example in a register of the memory controller 402.

Next, as data packets are transmitted, a determination 812 is made whether the prefetched data packet 414 containing an uncorrectable error has been transmitted for an intended use (i.e. to the requester 302). If so, a determination 814 is made whether the transmitted prefetched data packet 414 is associated with an identifier 412 having a suitable value. If the transmitted prefetched data packet 414 is associated with an identifier 412 or the identifier 412 has a suitable value, the prefetched data packet 414 contains an uncorrectable error and error recovery is initiated 816.

In certain embodiments, determining 814 that the prefetched data packet 414 is associated with an identifier 412 may cause a flag 420 to be set 818. For example, the flag 420 may be set 818 by causing a Set Read Check signal 608 to go high. Alternatively, a latch may be set to represent flag 420. The set flag 420 causes initiation 816 of error recovery. If a prefetched data packet 414 containing an error has not been transmitted 812 or is not associated 814 with an identifier 412, the method 800 ends 820.

Similarly, once error recovery is initiated 816, the method 800 ends 820. As mentioned above, error recovery may comprise an interrupt signal 112 sent to a central processor 102. The interrupt signal 112 may interrupt the data transfer until the error is recovered. If the error is recovered, the data transfer may resume with the next data packet. If the error is not recovered, the data transfer may be aborted.

In summary, method 800 illustrates a process in accordance with the present invention that allows for prefetched data packets 414 containing uncorrectable errors to be identified such that an error recovery process is not initiated until a prefetched data packet 414 containing an uncorrectable error is actually transmitted for the intended use. In this manner, prefetched data packets 414 containing uncorrectable errors that are not transmitted to a requester 302 do not needlessly incur the overhead required for and interruption caused by error recovery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing errors in prefetched data, the apparatus comprising:

a prefetch module comprising executable code stored on a storage device, executed by a processor, and configured to prefetch a data packet from a first location into a second location in anticipation of receiving a request for the prefetched data packet and prior to receiving the request;

a validation module comprising executable code stored on the storage device, executed by the processor, and configured to correct single bit errors in the prefetched data packet, determine that the prefetched data packet contains an uncollectable error, and store a first location address for the prefetched data packet with the uncollectable error, wherein the address is stored in the second location and no address is stored for prefetched data packets without uncorrectable errors;

an identification module comprising executable code stored on the storage device, executed by the processor, and configured to associate an identifier with the prefetched data packet prior to receiving the request if the prefetched data packet contains the uncollectable error, wherein the identifier is stored in the second location with the prefetched data packet;

a transfer module comprising executable code stored on the storage device, executed by the processor, and configured to transfer the prefetched data packet from the second location if the request is received;

an error recovery module comprising executable code stored on the storage device, executed by the processor, and configured to selectively initiate an error recovery process for the transferred prefetched data packet that has been determined to contain an uncorrectable error if the identifier is associated with the prefetched data packet by setting a flag; and the validation module is further configured to signal an interrupt to initiate the error recovery process in response to the set flag, wherein the error recovery process comprises re-retrieving the data packet from the first location using the address.

2. An apparatus for managing errors in prefetched data, the apparatus comprising:

a request module configured to request a transfer of a data packet from a first location by way of a communication bus;

a data transfer interface configured to prefetch the data packet from the first location into a second location in anticipation of receiving a request from the request module for the prefetched data packet and prior to receiving the request and transferring the data to the request module across the communication bus, the data transfer interface further configured to correct single bit errors in the prefetched data packet, determine that the prefetched data packet contains an uncorrectable error, store a first location address for the prefetched data packet with the uncorrectable error, wherein the address is stored in the second location and no address is stored for prefetched data packets without uncorrectable errors, associate an identifier with the prefetched data packet prior to receiving the request if the prefetched data packet contains the uncorrectable error, store the identifier in the second location with the prefetched data packet, to selectively initiate an error recovery process for the prefetched data packet if the prefetched data packet is transferred to the request module and the identifier is associated with the prefetched data packet by setting a flag, and signaling an interrupt to initiate the error recovery process in response to the set flag, wherein the error recovery process comprises re-retrieving the data packet from the first location using the address.

3. A system for managing errors in prefetched data, comprising:

a memory interface module comprising executable code stored on a storage device, executed by a processor, and configured to prefetch a data packet from a memory array to a temporary buffer in anticipation of receiving a request for the prefetched data packet and prior to receiving the request;

a validation module comprising executable code stored on the storage device, executed by the processor, and in communication with the memory interface module, the validation module configured to collect single bit errors in the prefetched data packet, determine whether the prefetched data packet contains an uncollectable error, and store a memory away address for the prefetched data packet with the uncorrectable error, wherein the address is stored in the temporary buffer and no address is stored for prefetched data packets without uncorrectable errors;

an identification module comprising executable code stored on the storage device, executed by the processor, and configured to associate an identifier with the prefetched data packet prior to receiving the request if the prefetched data packet contains the uncollectable error, wherein the identifier is stored in the temporary buffer with the prefetched data packet;

a communication module comprising executable code stored on the storage device, executed by the processor, and in communication with the temporary buffer, the communication module configured to transmit the prefetched data packet from the temporary buffer across a communication bus to a requesting device if the request is received;

an error recovery module comprising executable code stored on the storage device, executed by the processor, and in communication with the communication module, the error recovery module configured to selectively initiate an error recovery process for the prefetched data packet by setting a flag if the identifier is associated with the prefetched data packet and the prefetched data packet has been transmitted by the communication module; and the validation module is further configured to signal an interrupt to initiate the error recovery process in response to the set flag, wherein the error recovery process comprises re-retrieving the data packet from the memory away using the address.

4. A method for managing errors in prefetched data, the method comprising:

prefetching a data packet from a first location into a second location in anticipation of receiving a request for the prefetched data packet and prior to receiving the request;

correcting single bit errors in the prefetched data packet;

determining that the prefetched data packet contains at least one uncorrectable error;

storing a first location address for the prefetched data packet with the uncorrectable error, wherein the address is stored in the second location and no address is stored for prefetched data packets without uncorrectable errors;

associating an identifier with the prefetched data packet prior to receiving the request if the prefetched data packet contains the at least one uncorrectable error, wherein the identifier is stored in the second location with the prefetched data packet;

determining that the prefetched data packet in the second location has been transmitted for an intended use in response to the request;

selectively initiating an error recovery process only for the prefetched data packet by setting a flag if the identifier is associated with the prefetched data packet and the prefetched data packet has been transmitted for an intended use; and signaling an interrupt to initiate the error recovery process in response to the set flag, wherein the error recovery process comprises re-retrieving the data packet from the first location using the address.

5. An apparatus for managing errors in prefetched data, comprising:

means for prefetching a data packet from a first location into a second location in anticipation of receiving a request for the prefetched data packet and prior to receiving the request, the prefetching means comprising executable code stored on a storage device and executed by a processor;

means for correcting single bit errors in the prefetched data packet, the correcting means comprising executable code stored on the storage device and executed by the processor;

means for determining that the prefetched data packet contains at least one uncorrectable error, the error determining means comprising executable code stored on the storage device and executed by the processor;

means for storing a first location address for the prefetched data packet with the uncollectable error, wherein the address is stored in the second location and no address is stored for prefetched data packets without uncorrectable errors, the storing means comprising executable code stored on the storage device and executed by the processor;

means for associating an identifier with the prefetched data packet prior to receiving the request if the prefetched data packet contains the at least one uncorrectable error, wherein the identifier is stored in the second location with the prefetched data packet, the associating means comprising executable code stored on the storage device and executed by the processor;

means for determining that the prefetched data packet in the second location has been transmitted for an intended use in response to the request, the packet determining means comprising executable code stored on the storage device and executed by the processor; and means for selectively initiating an error recovery process only for the prefetched data packet by setting a flag if the identifier is associated with the prefetched data packet and the prefetched data packet has been transmitted for an intended use, the initiating means comprising executable code stored on the storage device and executed by the processor; and means for signaling an interrupt to initiate the error recovery process in response to the set flag, wherein the error recovery process comprises re-retrieving the data packet from the first location using the address, the signaling means comprising executable code stored on the storage device and executed by the processor.

6. An article of manufacture comprising a program storage medium readable by a processor and embodying one or more instructions executable by a processor to perform a method for managing errors in prefetched data, the method comprising:

prefetching a data packet from a first location into a second location in anticipation of receiving a request for the prefetched data packet and prior to receiving the request;

correcting single bit errors in the prefetched data packet;

determining that the prefetched data packet contains at least one uncorrectable error;

storing a first location address for the prefetched data packet with the uncorrectable error, wherein the address is stored in the second location and no address is stored for prefetched data packets without uncorrectable errors;

associating an identifier with the prefetched data packet prior to receiving the request if the prefetched data packet contains the at least one uncorrectable error, wherein the identifier is stored in the second location with the prefetched data packet;

determining that the prefetched data packet in the second location has been transmitted for an intended use in response to the request; and selectively initiating an error recovery process for the prefetched data packet by setting a flag if the identifier is associated with the prefetched data packet and the prefetched data packet has been transmitted for an intended use; and signaling an interrupt to initiate the error recovery process in response to the set flag, wherein the error recovery process comprises re-retrieving the data packet from the first location using the address.

* * * * *